Feb. 11, 1964  H. P. KALMUS  3,121,228
DIRECTION INDICATOR
Filed May 1, 1961  3 Sheets-Sheet 1
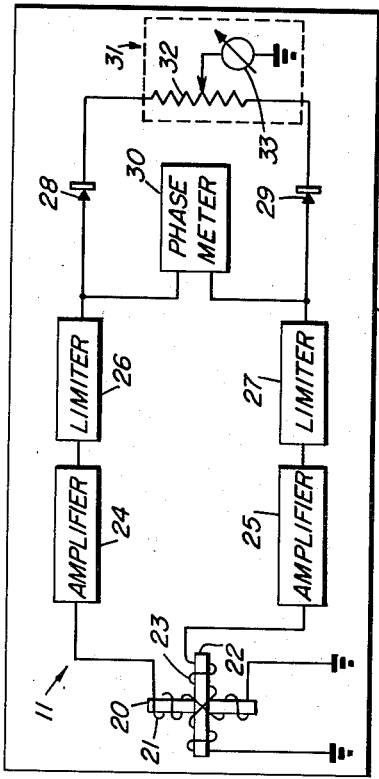
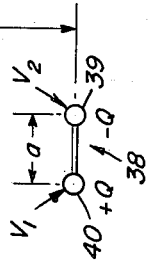
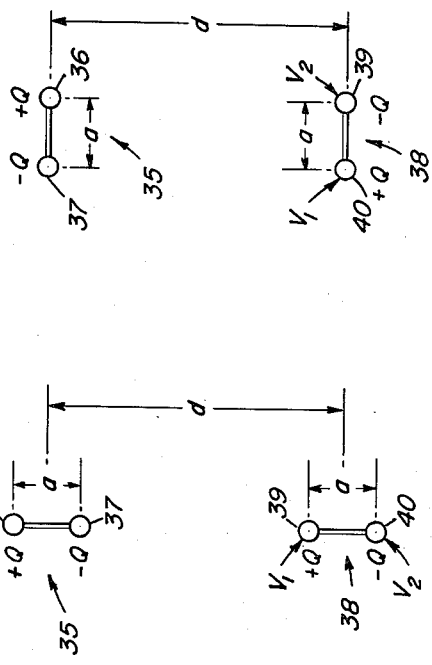
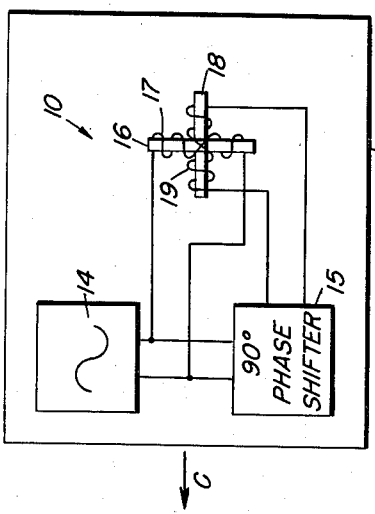
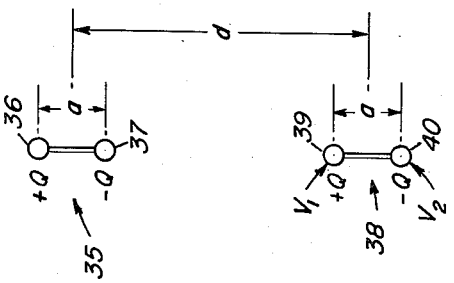
INVENTOR
*Henry P. Kalmus*

Feb. 11, 1964 H. P. KALMUS 3,121,228
DIRECTION INDICATOR
Filed May 1, 1961 3 Sheets-Sheet 2

INVENTOR
Henry P. Kalmus

BY S. J. Rotondi, G. J. Dupont,
A. E. McGee & J. P. Vandenburg

United States Patent Office 3,121,228
Patented Feb. 11, 1964

3,121,228
DIRECTION INDICATOR
Henry P. Kalmus, 3000 University Terrace NW.,
Washington 16, D.C.
Filed May 1, 1961, Ser. No. 106,986
6 Claims. (Cl. 343—113)
(Granted under Title 35, U.S. Code (1952), sec. 266)

The invention described herein may be manufactured and used by or for the Government for governmental purposes without payment to me of any royalty thereon.

This application is a continuation-in-part of my co-pending application Serial No. 832,413, filed August 7, 1959, now U.S. Patent No. 3,046,549, granted July 24, 1962, for a Short Range Tracking System.

This invention relates to short range guiding and tracking systems for vehicles. In particular, the invention allows a following vehicle to determine accurately both the direction of movement of a leading vehicle and the distance separating the vehicles.

In the conventional tracking systems used in military truck convoys and in similar environments, the following vehicle is informed of its distance from and the direction of a leading vehicle by means of visual observations or radio signals. At night, the lights located at the rear of the leader may be observed. These conventional methods suffer many serious disadvantages in actual practice. With systems which convey information of this kind by light waves, dust, dirt or fog often obscures the sources of light positioned on the leading vehicle. One important disadvantage of radio waves is that the radiation field strength, being inversely proportional to the first power of distance from the transmitting antenna, decreases slowly with distance. Therefore, the radiation from one vehicle extends with substantial strength to many other vehicles of a convoy, instead of being confined to the region of the vehicle immediately behind it, as is desired. Further, in military situations, both light and radio waves increase the risks of detection of the convoy by the enemy.

In certain vehicle tracking systems heretofore devised, the induction field of a single coil transmitter is sensed by two perpendicular coils of a receiver. After amplification and detection of the induced voltages, both the sum and the difference of the detected signals are formed, the sum indicating distance and the difference giving the direction indication. Such an arrangement, for example, is disclosed in my aforementioned co-pending application Serial No. 832,413. This arrangement has not proved entirely satisfactory for the reason that the receiver is sensitive to transmitter rotation, whereas only rotation of the receiver away from the instantaneous direction of the transmitter is desired to be measured. The directional pattern of the transmitter field may account for this unwanted variation in the receiver's response.

An object of the present invention is to provide a new and improved communication system.

Another object of this invention is to furnish a new and improved communication system for moving vehicles.

A further object is to provide a new and improved short range tracking and guidance system with which a following vehicle may precisely measure the distance and direction of movement of a leading vehicle.

Still another object is to provide a method of conveying directional tracking information which is dependent only upon the relative directions of travel of two vehicles.

A further object is to provide a direction indicating device not requiring any critical adjustments and independent of both amplifier gain variations and directional patterns of antennas.

An additional object of the present invention is to supply a simple, dependable and economical tracking and guidance system for moving vehicles which eliminates those disadvantages associated with light or radio waves.

The specific nature of the invention, as well as other objects, uses and advantages thereof, will clearly appear from the following description and from the accompanying drawing, in which:

FIG. 1 is a circuit diagram showing the transmitter and the receiver of the tracking and guidance system of this invention.

FIGS. 2a, 2b and 2c are diagrams of electric dipoles used for deriving the values of the voltages induced in the receiver coils of FIG. 1.

Figure 3A:
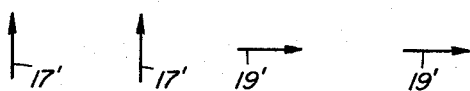
FIGS. 3a and 3b are vector diagrams illustrating the transmitter and receiver voltages.

In FIG. 1 of the drawing, block 12 represents a leading vehicle, while block 13 represents another vehicle which is intended to follow in the same path taken by vehicle 12. Vehicles 12 and 13 normally proceed one behind the other along a straight line course in the direction of arrow C. A transmitter 10 is mounted fixedly on leading vehicle 12, and a receiver 11 is similarly mounted on vehicle 13.

The transmitter 10 comprises two identical coils 17 and 19 wound, respectively, upon two ferrite rods 16 and 18. These coils are horizontally mounted in a permanent manner upon vehicle 12 in a central position at its rear, and oriented perpendicular to each other as shown. Coil 17 is energized directly by a source 14 of alternating current. A phase shifter 15 connected between source 14 and coil 19 introduces a 90 degree time phase to the current from source 14, which is then applied to coil 19. Phase shifter 15 may comprise any suitable circuit of passive reactance elements proportioned to give a 90 degree phase shift in either sense, so that the current coil 19 leads or lags that in coil 17. The current source 14 preferably has a low frequency, low power output, and may for example be a transistor oscillator. Its frequency is not critical, but 40 kilocycles has been found satisfactory. Coils 17 and 19 together generate an induction field which is confined to the immediate vicinity of transmitter 10, since the strength of the induction field of a dipole is inversely proportional to the third power of distance. This induction field has a circular directional pattern since coils 17 and 19 are arranged in space quadrature and electrically excited in time quadrature.

When vehicle 13 remains a relatively short distance behind vehicle 12, receiver 11 senses the induction field of transmitter 10. The receiver 11 has two identical coils 21 and 23 which are wound, respectively, on ferrite rods 20 and 22. Coils 21 and 23 are horizontally mounted on the following vehicle 13 in a front center location. These coils are at right angles to each other, with their centers in close proximity. When the following vehicle is properly aligned behind leader 12, i.e. following in its path, coil 21 is parallel to coil 17 of transmitter 10, and coil 23 is aligned axially with coil 19, as illustrated in FIG. 1. The induction field of coils 17 and 19 develops voltages in coils 21 and 23 of receiver 11. Applicant has discovered that the phase difference between the two voltages induced in coils 21 and 23 depends only upon the angle between the axes of coils 17 and 21 or of coils 19 and 23. Applicant has further found that the sum of these voltages depends upon the distance between vehicles 12 and 13 is substantially independent of their angular relationship. The aforesaid phase difference is therefore a measure of any change in direction by vehicle 12 from a straight line route C, as observed from vehicle 13, while the voltage sum indicates the distance separating vehicles 12 and 13. It should be realized that these properties, being based upon the near field or induction field, exist only over distances from transmitter 10 which are much smaller than one wavelength of the transmitted signal.

Consideration of the voltages induced between dipoles by a quasi-stationary or induction field will aid in understanding the aforementioned relationship between the phase difference of the two received voltages and the angle between the vehicles' directions. The following analysis is based upon electric dipoles, but the same results may be arrived at using magnetic poles. In FIGS. 2a, 2b and 2c of the drawing, dipoles 35 and 38 are the electric field equivalents, respectively, of the transmitting and receiving coils of FIG. 1. Dipole 35 comprises charged bodies 36 and 37 separated by distance $a$, due to the A.-C. potential difference established across the transmitter coils. The dipole 38 is formed by charges 39 and 40 separated the same distance $a$, the coils 17, 19, 21 and 23 being approximately the same length, due to the forces associated with the induction field. The centers of dipoles 35 and 38 are spaced a distance $d$ which with normal vehicle separation is much larger than length $a$. From the general expression $$V = \frac{q}{r}$$

for the dipole orientation shown in FIG. 2a, the potential of body 39 is $$V_1 = \frac{Q}{d} + \frac{-Q}{d-a} = Q\left(\frac{1}{d} - \frac{1}{d-a}\right)$$

Similarly, the potential $V_2$ of body 40 is $$V_2 = \frac{Q}{d+a} + \frac{-Q}{d} = Q\left(\frac{1}{d+a} - \frac{1}{d}\right)$$

Thus, the potential difference induced across dipole 38 is:

$$\Delta V = V_2 - V_1$$
$$= Q\left[\left(\frac{1}{d+a} - \frac{1}{d}\right) - \left(\frac{1}{d} - \frac{1}{d-a}\right)\right]$$
$$= Q\left(-\frac{2}{d} + \frac{1}{d+a} + \frac{1}{d-a}\right)$$
$$= Q\left(\frac{-2d^2 + 2a^2 + d^2 - ad + d^2 + ad}{d(d^2 - a^2)}\right)$$
$$\Delta V = \frac{2a^2}{d(d^2 - a^2)} Q$$

Since $d \gg a$, to a close approximation $$\Delta V \doteq \frac{2a^2}{d^3} Q$$

For convenience, let $$E = \frac{a^2}{d^3} Q$$

and then the induced voltage at any distance is 2E when the dipoles are axially aligned.

When the two dipoles are oriented parallel to each other as in FIG. 2b, $$V_1 = \frac{Q}{\sqrt{d^2+a^2}} + \frac{-Q}{d} = Q\left(\frac{1}{\sqrt{d^2+a^2}} - \frac{1}{d}\right)$$

$$V_1 = Q[-d^{-1} + (d^2+a^2)^{-1/2}]$$

By employing the binomial law and neglecting higher powers, the latter equation may be written as $$V_1 \doteq Q[-d^{-1} + d^{-1} - \tfrac{1}{2}d^{-3}a^2] = -\frac{a^2}{2d^3}Q$$

Similarly, $$V_2 = \frac{Q}{d} + \frac{-Q}{\sqrt{d^2+a^2}} = Q\left[\frac{1}{d} - \frac{1}{\sqrt{d^2+a^2}}\right]$$

$$V_2 = Q[d^{-1} - (d^2+a^2)^{-1/2}]$$

$$V_2 \doteq Q[d^{-1} - d^{-1} + \tfrac{1}{2}d^{-3}a^2] = \frac{a^2}{2d^3}Q$$

Thus the induced potential difference is $$\Delta V = Q\left[\frac{a^2}{2d^3} - \left(-\frac{a^2}{2d^3}\right)\right] = \frac{a^2}{d^3}Q = E$$

When the dipoles are parallel, then, the induced voltage is E, in accordance with the definition stated before.

When the dipole axes are perpendicular, as shown in FIG. 2c, with one axis intersecting the center of the other dipole, the induced voltage $\Delta V$ will be zero, as is well known. This can be shown by assuming a separation of charges $+Q$ and $-Q$ in dipole 38 and deriving $V_1$ and $V_2$, as above. It is found that $V_1 = V_2$, so that $\Delta V = 0$.

Figure 3B:
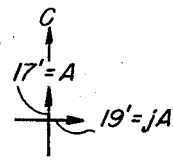

The results obtained for the various dipole orientations of FIGS. 2a, 2b and 2c apply to the coils of transmitter 10 and receiver 11 in the manner indicated in FIG. 3a, when the vehicles 12 and 13 are both on the same course and properly aligned. Vector 17' repersents coil 17 which induces the voltage 2E, represented by vector 21', in coil 21. Coil 23, being perpendicular to coil 17, has no voltage therein due to coil 17. Similarly, due to transmitter coil 19 represented by vector 19', a voltage E is generated in coil 23, but none in coil 21. FIG. 3b shows the superposition of these components where vectors 17' and 19' are predetermined transmitter voltages A and jA as shown, accounting for the 90° phase displacement introduced by element 15. Vectors 21' and 23' of FIG. 3b are resulting voltages 2E and jE appearing, respectively, in coils 21 and 23.

Figure 4:
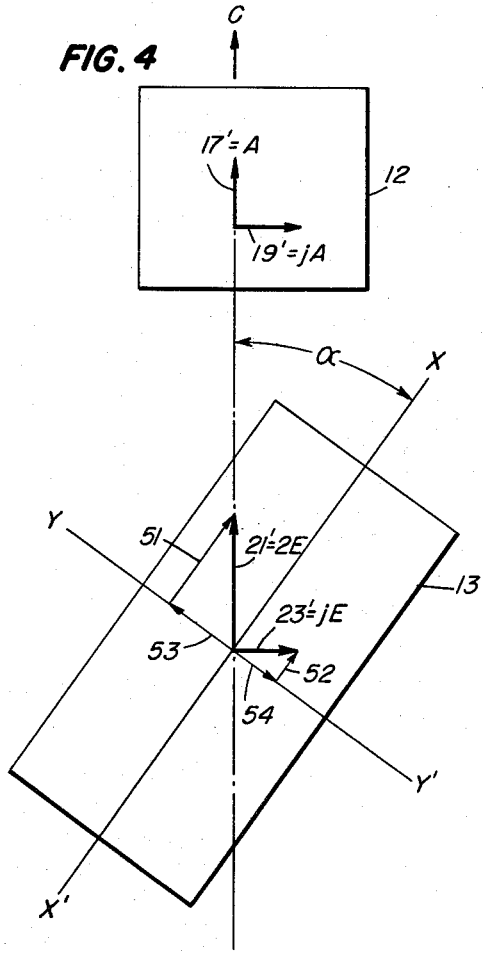
FIG. 4 is another vector diagram of voltages used for explaining the operation of the receiver of this invention.
Figure 5:
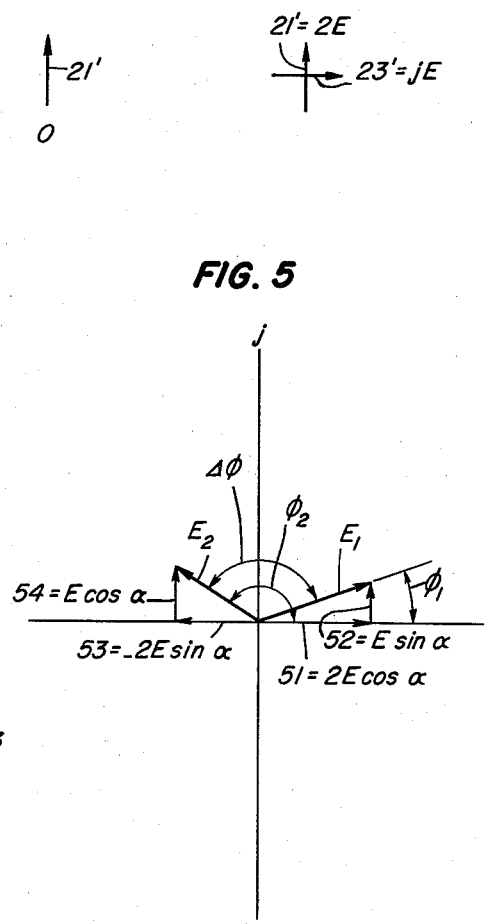
FIG. 5 is a diagram of the receiver voltages showing their time relationship.

FIGS. 4 and 5 illustrate the effect upon the voltages generated in coils 21 and 23 of any rotation or deviation of vehicle 13 from the straight line direction or course taken by vehicle 12. If following vehicle 13 is "off course" by some angle $\alpha$ as shown in FIG. 4, the situation depicted in FIG. 3b is changed in the following manner. In FIG. 4, vectors 21' and 23' again represent the induced voltages which would be received for an "on course" position. Coil 21 is now positioned along on axis X—X' of FIG. 4 and detects a voltage $E_1$, shown in FIG. 5, which contains the two components 51 and 52 of FIG. 4. Similarly, coil 23 on axis Y—Y' detects a voltage $E_2$ having components 53 and 54. It can be seen from FIG. 4 that $$E_1 = E(2\cos\alpha + j\sin\alpha)$$

and $$E_2 = E[2\cos(\alpha + 90°) + j\sin(\alpha + 90°)]$$

or $$E_2 = E(-2\sin\alpha + j\cos\alpha)$$

FIG. 5 is a time diagram of voltages $E_1$ and $E_2$ which shows their phase relationship. We have $$\tan\phi_1 = \frac{\sin\alpha}{2\cos\alpha} = \tfrac{1}{2}\tan\alpha, \quad \phi_1 = \tan^{-1}\left(\frac{\tan\alpha}{2}\right)$$

$$\tan\phi_2 = \frac{\cos\alpha}{-2\sin\alpha} = \frac{1}{-2\frac{\sin\alpha}{\cos\alpha}} = -\frac{1}{2\tan\alpha}$$

Then $$\Delta\phi = \phi_1 - \phi_2 = \tan^{-1}\left(\frac{\tan\alpha}{2}\right) - \tan^{-1}\left(-\frac{1}{2\tan\alpha}\right)$$

From the identity $$\tan^{-1} x - \tan^{-1} y = \tan^{-1}\left(\frac{x-y}{1+xy}\right)$$

$$\Delta\phi = \tan^{-1}\left[\frac{\frac{\tan\alpha}{2} - \left(\frac{-1}{2\tan\alpha}\right)}{1 + \left(\frac{\tan\alpha}{2} \cdot \frac{-1}{2\tan\alpha}\right)}\right]$$

$$= \tan^{-1}\left[\frac{\frac{\tan\alpha}{2} + \frac{1}{2\tan\alpha}}{1 - \frac{1}{4}}\right]$$

Therefore $$\Delta\phi = \tan^{-1}\left[\frac{2}{3}(\tan\alpha + \cot\alpha)\right]$$

$$\Delta\phi = \tan^{-1}\left[\frac{2}{3}\left(\frac{\sin\alpha}{\cos\alpha} + \frac{\cos\alpha}{\sin\alpha}\right)\right]$$

$$\Delta\phi = \tan^{-1}\left[\frac{2}{3}\left(\frac{\sin^2\alpha + \cos^2\alpha}{\sin\alpha \cdot \cos\alpha}\right)\right] = \tan^{-1}\left[\frac{2}{3} \frac{1}{\sin\alpha\cos\alpha}\right]$$

Then, since $2\sin\alpha\cos\alpha = \sin 2\alpha$, $$\Delta\phi = \tan^{-1}\left[\frac{4}{3\cdot 2 \sin\alpha\cos\alpha}\right]$$

Therefore, the phase difference between $E_1$ and $E_2$ is $$\Delta\phi = \tan^{-1}\left(\frac{4}{3\sin 2\alpha}\right)$$

Figure 6:
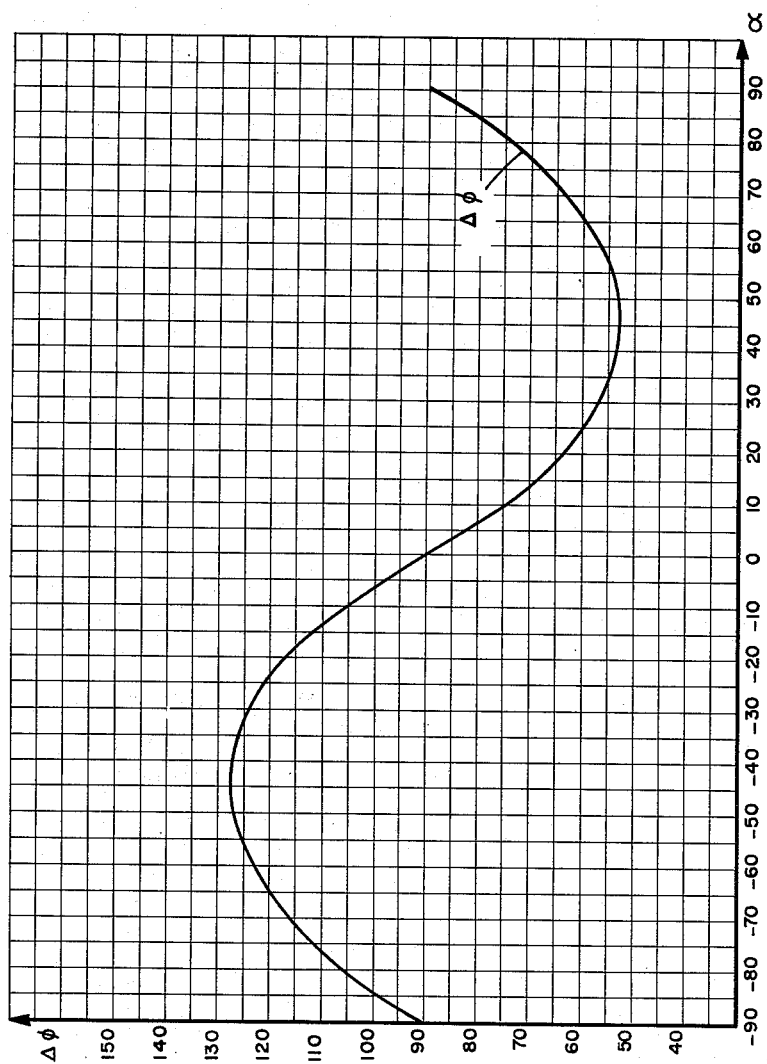
FIG. 6 is a plot of the phase difference between receiver voltages against the receiver angular position.

When the vehicles are proceeding in the same direction and $\alpha = 0$, $\Delta\phi = \tan^{-1}\infty = 90°$. This corresponds to FIG. 3b, with $E_1 = 2E$ and $E_2 = jE$, i.e. a 90° phase difference. FIG. 6 is a plot of the above relationship between $\Delta\phi$ and $\alpha$ for the induction field detected by receiver 11. It can be seen that, for $\alpha = \pm 90°$, $\Delta\phi$ returns to 90°. Nonambiguous directional information is obtained as long as the relative physical rotation between the vehicles does not exceed 90°.

In the receiver 11 of FIG. 1, coil 21 is coupled by means of an amplifier 24 and a symmetric limiter 26 to one input terminal of a phase difference measuring circuit 30, which may be any conventional phase meter. Circuit 30 may alternatively be a standard phase discriminator providing a D.C. output voltage proportional to the phase difference of its input voltages. Coil 23 is similarly connected through an amplifier 25 and a symmetric limiter 27 to the other input of meter 30. The signal voltages $E_1$ from coil 21 and $E_2$ from coil 23 are separately amplified and limited by circuits 24, 26, and 25, 27; and then their phase difference $\Delta\phi$ is measured and indicated by phase meter 30. In receiver 11, correct indication of direction does not depend upon maintaining equal gain characteristics for amplifiers 24 and 25, as was the case in amplitude-sensitive systems of the prior art. Here, the only requirement is that the two channels have linear phase characteristics over the amplitude range encountered. As will be apparent to those skilled in the art, the limiters 26 and 27 assure the required phase response. The phase meter 30 thus provides a direct indication of deviation of the following vehicle 13 from the direction of leader 12 at any given instant. To calibrate properly the meter 30, the slope of the $\Delta\phi$ curve is computed, so that the phase shift for one degree of rotation of the receiver 11, for instance, is known. Since the slope of the tangent to the FIG. 6 curve is $$\frac{d(\Delta\phi)}{d\alpha}$$

the derivative gives the desired slope. We have $\Delta\phi = \tan^{-1} x$ where $$x = \frac{4}{3\sin 2\alpha}$$

Then $$\frac{d(\Delta\phi)}{d\alpha} = \frac{d(\Delta\phi)}{dx} \cdot \frac{dx}{d\alpha}$$

Since $$\frac{d(\tan^{-1} x)}{dx} = \frac{1}{1+x^2}$$

and $$\frac{dx}{d\alpha} = \frac{4}{3} \cdot \frac{-2\cos 2\alpha}{\sin^2 2\alpha}$$

$$\frac{d(\Delta\phi)}{d\alpha} = \left[\frac{1}{1 + \frac{16}{9\sin^2 2\alpha}}\right] \cdot \left[-\frac{4}{3\sin^2 2\alpha}(2\cos 2\alpha)\right]$$

$$= \left[-\frac{9\sin^2 2\alpha}{9\sin^2 2\alpha + 16}\right] \cdot \left[\frac{4}{3\sin^2 2\alpha}(2\cos 2\alpha)\right]$$

$$\frac{d(\Delta\phi)}{d\alpha} = -\frac{24\cos 2\alpha}{9\sin^2 2\alpha + 16}$$

At the point $$\alpha = 0, \quad \frac{d(\Delta\phi)}{d\alpha} = -\frac{24}{16} = -1.5$$

and $$\Delta\phi = \frac{d(\Delta\phi)}{d\alpha} \cdot \Delta\alpha$$

For $\Delta\alpha = 1°$, we obtain $\Delta\phi = -1.5°$. This is a phase difference measurable even with a simple phase meter, so that slight changes in direction are determined accurately by receiver 11.

Receiver 11 further derives distance information from the voltages induced in its sensing coils 21 and 23. The anodes of diodes 28 and 29 are connected, respectively, to limiters 26 and 27, their cathodes being connected to a conventional adder circuit 31, which forms the sum of the diode output voltages. Such summing circuits are well known in the art and are represented schematically in FIG. 1 by a potentiometer 32 and a voltmeter 33 connected between the center tap of potentiometer 32 and circuit ground.

In operation, diodes 28 and 29 rectify, respectively, the amplified voltages $E_1$ and $E_2$ from limiters 26 and 27. The diodes 28 and 29 detect the A.C. voltages applied to their anodes, and there appears at each cathode a pulsating D.C. voltage. The adder circuit 31 serves to form the sum of the average values of these D.C. voltages, and meter 33 displays the result. Since the induction field strength is proportional to distance from its source, transmitter 10, the amplitudes of induced voltages $E_1$ and $E_2$, and consequently the detected outputs of diodes 28 and 29, are correspondingly proportional to distance between transmitter 10 and receiver 11. Meter 33 may be suitably calibrated to show directly the distance between vehicles 12 and 13.

For the convenience of the operator of following vehicle 13, the output voltages of phase measuring circuit 30 and adder circuit 31 may be applied, if desired, to various well-known types of visual or aural indicators. For example, the output voltages of circuits 30 and 31 can be used to control the frequencies of audio oscillators so that musical tones heard by the operator of vehicle 13 will tell him whether he is at a proper distance from vehicle 12, and also whether leading vehicle 12 is moving straight ahead or turning right or left, and the sharpness of such turns. These two voltages could also be used to operate the well-known "A–N" system of aircraft navigation, in which the pilot hears a "dot-dash-dot-dash" series of tones for deviations to one side of the true course and a "dash-dot-dash-dot" series for opposite deviations.

As was mentioned above, vehicles 12 and 13 might be trucks or any land vehicles, but this invention is not limited to use with land vehicles. It can be employed in the same manner for sea vessels or aircraft. In air-to-air refueling of aircraft, where altimeter circuits maintain two aircraft on a given horizontal plane, the circuit of this invention will allow the pilots to keep their planes in the desired relative position while refueling proceeds. It should be apparent that this invention is not limited to two-vehicle arrangements. Where three or more vehicles make up a convoy, all but the first and last would be supplied with both a transmitter 10 and a receiver 11.

It will be apparent that the embodiment shown is only exemplary and that various modifications can be made in construction and arrangement within the scope of the invention as defined in the appended claims.

I claim as my invention:

1. In a short range tracking system for vehicles, means located upon a first vehicle for producing a circularly polarized induction field, coil means located upon a second vehicle having a plurality of voltages induced therein by said induction field, a plurality of amplifying and limiting means for separately amplifying said voltages, means for measuring the phase difference between said amplified voltages to indicate changes in direction of said second vehicle with respect to the direction of travel of said first vehicle, means for detecting said amplified voltages, and adding means for forming the sum of said amplified and detected voltages to indicate the distance separating said first and said second vehicles.

2. In a short range tracking system for vehicles, coil means mounted on a following vehicle, means mounted on a leading vehicle for producing a circularly polarized induction field, said field inducing a plurality of voltages in said coil means, a plurality of amplifying means for separately amplifying said voltages, and means for measuring the phase difference between said amplified voltages to determine the magnitude and sense of any deviation by the following vehicle from the course of the leading vehicle.

3. In a vehicle tracking system, transmitting means located on a first vehicle for providing a local induction field, receiving means located on a second vehicle for sensing said induction field, said receiving means comprising a pair of perpendicularly oriented coils in which voltages are induced by said field, an amplifier connected to each coil, a symmetric limiter for maintaining constant phase shift characteristics connected to the output of each amplifier, and phase shift determining means connected to the outputs of said limiters for indicating the direction of travel of said second vehicle with respect to the direction of said first vehicle said phase shift determining means providing a non-ambiguous indication for all positions where an acute angle is formed between a line joining said first and said second vehicles and a line in the direction of travel of said second vehicle.

4. A vehicle tracking system comprising coil means mounted on a following vehicle, means mounted on a leading vehicle for generating an induction field, and means for measuring the phase difference between voltages induced in said coil means by said induction field to indicate the bearing of said following vehicle with respect to said leading vehicle.

5. A vehicle tracking system comprising in combination: transmitting means mounted upon a first vehicle for providing an induction field; receiving means mounted upon a second vehicle for producing a plurality of voltages induced therein by said induction field; and means for measuring the phase difference between said voltages to determine the magnitude and polarity of deviations of said second vehicle from the direction of travel of said first vehicle.

6. A short range tracking system for vehicles comprising in combination: transmitting means located upon a first vehicle for providing a circularly polarized induction field, said transmitting means including two perpendicular coils excited in time quadrature; and receiving means located upon a second vehicle for sensing said induction field, said receiving means including a pair of perpendicular coils in which voltages are generated by said induction field, a pair of amplifiers connected respectively to said pair of coils, a pair of limiters connected respectively to said pair of amplifiers to maintain constant phase shift characteristics, a phase meter connected to the outputs of said limiters to measure the direction of said second vehicle with respect to the direction of said first vehicle; a pair of diodes connected respectively to the outputs of said limiters to detect said voltages, and an adder circuit connected to said diodes to sum said detected voltages, said sum indicating the distance separating said vehicles.

References Cited in the file of this patent

UNITED STATES PATENTS 2,613,349     Kandoian _____ Oct. 7, 1952